K. CRITTENDEN.
CLUTCH.
APPLICATION FILED JULY 12, 1910.
1,034,694.
Patented Aug. 6, 1912.
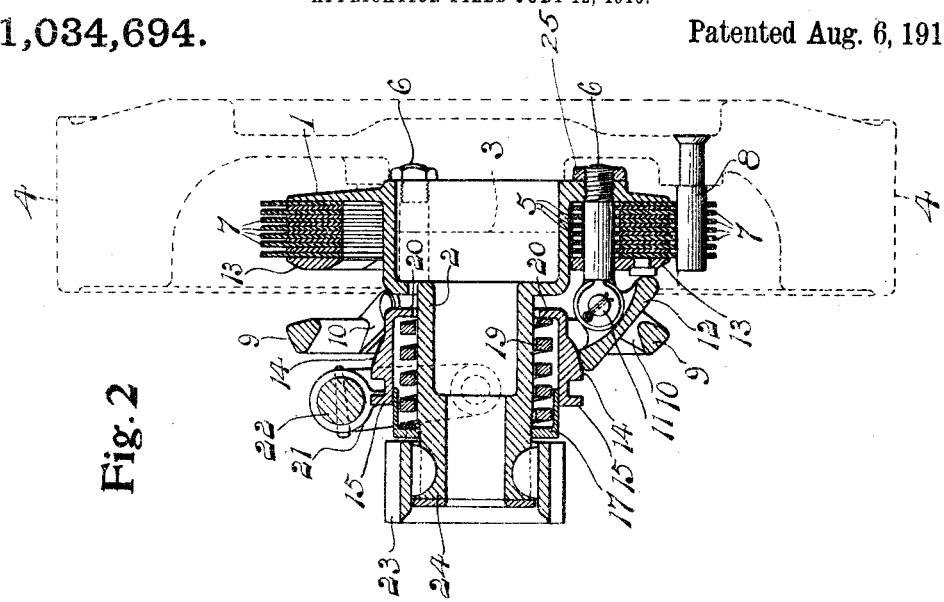
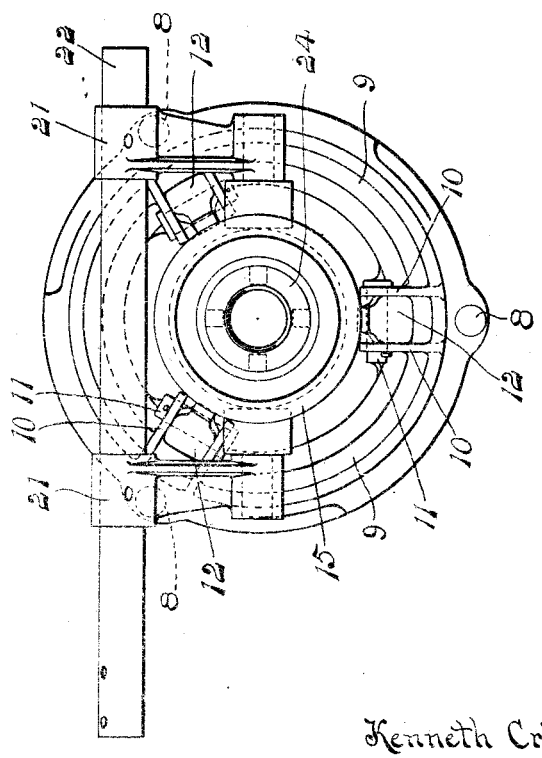
Witnesses
Inventor
Kenneth Crittenden
By
Attorneys

UNITED STATES PATENT OFFICE.

KENNETH CRITTENDEN, OF DETROIT, MICHIGAN.

CLUTCH.

1,034,694.  Specification of Letters Patent.  Patented Aug. 6, 1912.

Application filed July 12, 1910. Serial No. 571,549.

*To all whom it may concern:*

Be it known that I, KENNETH CRITTENDEN, a citizen of the United States of America, residing at Detroit, in the county of Wayne and State of Michigan, have invented certain new and useful Improvements in Clutches, of which the following is a specification, reference being had therein to the accompanying drawings.

In the construction of friction clutches of the multiple disk type, it is desirable that the pressure used in locking the clutch be applied as evenly as possible to the rings in order that the wear on the rings be properly distributed and in order that the clutch work smoothly.

This invention relates to multiple disk clutches and more particularly to means for setting up the clutch whereby the force applied to the friction members is evenly distributed.

The invention consists in the matters hereinafter set forth, and more particularly pointed out in the appended claims.

Referring to the drawings, Figure 1 is a view of the front face of a clutch that embodies features of the invention; and Fig. 2 is a view in longitudinal section therethrough together with adjacent portions of a fly wheel.

In the drawings a main plate 1 has a hub 2 extending from its front face by which it is centered on the hub 3 of a motor fly wheel 4 or other driving member. A series of inner friction disks 5 are non-rotatably secured in any preferred manner as by studs 6 to the face of the plate 1 said studs being adjustably secured to each plate by screwthreading their ends to engage screwthreaded openings in the plate, and providing lock-nuts therefor. Another set of friction rings 7 are secured in alternate relation to the disks 5 and are connected to rotate positively with the fly wheel 4 in any preferred manner, as, for example, by studs 8 extending from the face of the wheel. A spider 9 to support the outer ends of the studs 6 and to prevent the same from turning, is secured concentrically around the hub by pairs of inwardly extending lugs 10 whose ends are pivoted to the heads of said studs by suitable pins 11. The latter also act as fulcrums on which levers 12 are pivoted between the lugs of each pair with their inner ends bearing against a thrust collar 13 pressing against the outer face of the friction rings. The outer ends of the levers are spread outwardly by the wedging action of the cone face 14 of a slide collar 15. Normally the latter is held concentrically around the hub by a flanged ring 17, screwthreaded on the outer end of the hub 2, the slide being loosely rotatable and reciprocable on said ring and free to move laterally on the hub. A spiral spring 19 is in compression between an inner annular flange 20 on the slide and the member 17 and keeps the disks and plates normally in contact while positive movement of the slide is obtained by rock arms 21 extending from a rock shaft 22 that is arranged to be oscillated through any suitable controlling lever. A gear 23 keyed or secured on an extension 24 of the hub transmits power therefrom, the extension acting, if desired, as a bearing for the end of a follower shaft.

In operation, movement of the slide either through the influence of the spring or by the action of the rock arms thrusts the friction rings into frictional engagement with the disks thereby locking the main plate of the clutch to rotate with the fly wheel or member. Release of the clutch is obtained by moving the slide outwardly. By this arrangement of parts and more particularly the floating of the slide on the hub and flanged ring, the thrust of the spring and of the rock arm is transmitted axially of the plate and squarely against the face of the thrust collar, thus obviating any unequal pressure due to obliquity of action of the spring or unequal movement of the rock arms or levers. Furthermore the spring is completely housed while the wearing parts are open for inspection and adjustment, the lock-nuts 25 on the studs 6 being loosened and said studs turned farther into the plate 1 as the parts wear. The securing of the spider 9 to the outer ends of the studs by means of the pins 11 passing through lugs 10 embracing the heads of the studs and the levers thereon, brace said ends of the studs and prevent the same from turning and losing their adjustment in the plate and also hold the levers in operative position.

Obviously, changes in the details of construction may be made without departing from the spirit of the invention and I do not care to limit myself to any particular form or arrangement of parts.

What I claim as my invention is:—

1. A clutch comprising a rotatable driving member, a rotatable driven member having a hub portion, friction rings attached to the driving member to turn therewith, friction disks alternating with said rings, studs extending laterally from the driven member in engagement with said disks to cause said member to turn with said disks, a ring-shaped spider surrounding said hub portion of the driven member and connecting the outer free ends of said studs and supported by said studs independently of the hub portion, and means for moving the disks and rings into frictional contact.

2. A clutch comprising a rotatable driving member, a rotatable driven member, friction rings attached to the driving member to turn therewith, friction disks alternating with said rings, studs extending laterally from and adjustable relatively thereto by turning the studs, levers pivotally mounted upon said studs to move the disks and rings into frictional contact, a spider detachably attached to and carried by the outer ends of said studs to hold said studs from turning, and means for operating said levers.

3. A clutch comprising a rotatable driving member, a plate having a hub journaled concentrically on the hub of the member, studs extending from the face of said plate, friction disks non-rotatably secured on the plate by said studs, friction rings alternating with the disks non-rotatably secured on the driving member, a spider secured to and supported by the studs concentrically with the plate hub, levers pivotally mounted on the spider with their inner ends adapted to compress the disks and rings, a slide collar reciprocable on the hub of the member adapted to oscillate the levers when shifted on the hub, and means for shifting the collar.

4. A clutch comprising a rotatable driving member having a hub extending from one face thereof, a plate having a hub journaled on the member hub, studs extending laterally from the face of the plate around the hub thereof, friction disks centered on the hub and attached to the plate by said studs to rotate therewith, friction rings arranged alternately with the disks and non-rotatably attached to the driving member to turn therewith, a spider having pairs of inwardly extending lugs with each pair attached to the outer end of a plate stud, a thrust collar, levers each pivoted between the spider lugs with its inner end bearing against the thrust collar, a slide collar longitudinally reciprocable upon the hub of the plate and adapted to force the levers against the thrust collar, and means to shift the slide collar.

5. A clutch comprising a rotatable driving member, studs on the driving member, a plate having a hub journaled concentrically on the driving member, studs extending from the outer face of the plate around the hub thereof and adjustable thereon by turning said studs, friction disks non-rotatably secured on the face of the plate by the studs thereof, friction rings non-rotatably secured to the driving member in alternate relation with the disks by the studs on said member, a thrust collar bearing against the outer face of the assembled rings, and disks, a spider having pairs of inwardly projecting lugs each pair embracing the outer end of one of the studs, a lever pivotally attached to the outer end of each stud between said ears to bear at one end against the thrust collar, a slide collar longitudinally reciprocable on the plate hub between the outer ends of the levers, and means for shifting the slide collar.

6. A clutch comprising a rotatable driving member, a plate, a hub journaled concentrically on the driving member, studs extending laterally from the plate around the hub, friction disks on the plate hub non-rotatably attached thereto by said studs, friction rings in alternate relation with the disks non-rotatably mounted on the driving member, a thrust collar bearing against the outer face of the assembled rings and disks, levers each fulcrumed upon the end of one of the studs with its inner end bearing against the thrust collar, a flanged ring loosely mounted upon the outer end of the hub, a slide collar longitudinally reciprocable and free to move laterally upon the plate hub and having a cone surface adapted to engage the outer ends of the levers and force their inner ends against the thrust collar when said collar is moved longitudinally, a spring in compression between the ring and collar, and means for shifting the collar.

7. A clutch comprising a rotatable driving member, a plate provided with a hub journaled concentrically on the driving member, studs having screwthreaded engagement with said plate at one end and projecting laterally therefrom around the hub, friction disks attached to the plate by the studs, friction rings alternating with the disks and attached to the driving member to turn therewith, a spider having pairs of lugs embracing the outer ends of said studs and detachably attached thereto, a lever between each pair of lugs pivotally attached to the end of the stud embraced by said lugs, a thrust collar bearing against the outer face of the assembled disks and rings against which collar the inner ends of the levers bear, a slide collar longitudinally reciprocable upon the hub of said plate and provided with a conical face adapted to engage the outer ends of the levers and spread the same when the collar is moved toward the disks, a spring around the hub engaging the collar to move the same toward the disks, and means for positively shifting the slide collar.

In testimony whereof I affix my signature in presence of two witnesses.

KENNETH CRITTENDEN.

Witnesses:
  ANNA M. DORR,
  OTTO F. BARTHEL.